F. A. WARNER.
ICE HARVESTING MACHINE.
APPLICATION FILED SEPT. 5, 1916.

1,228,270.

Patented May 29, 1917.
5 SHEETS—SHEET 1.

Inventor
F. A Warner

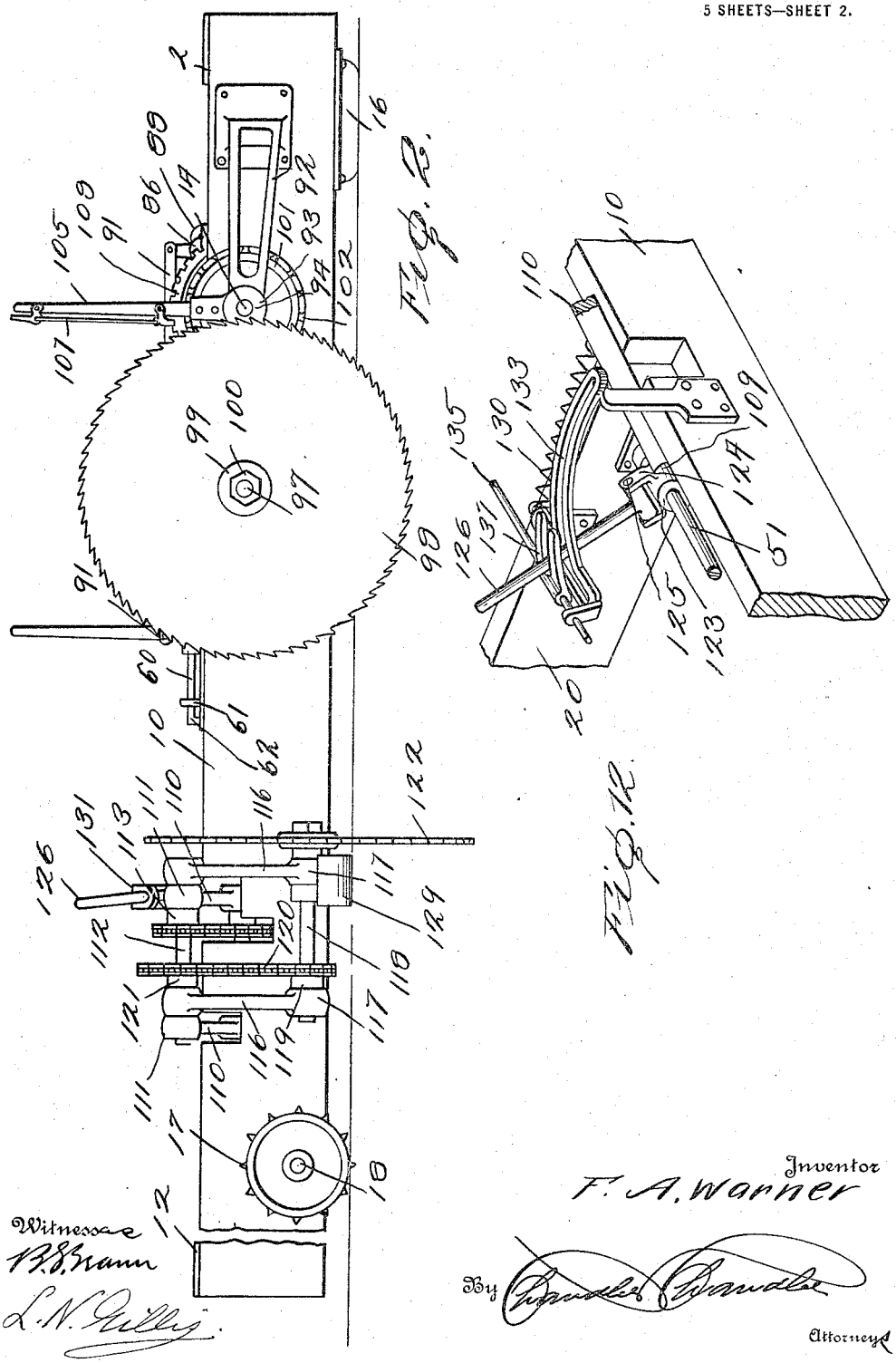

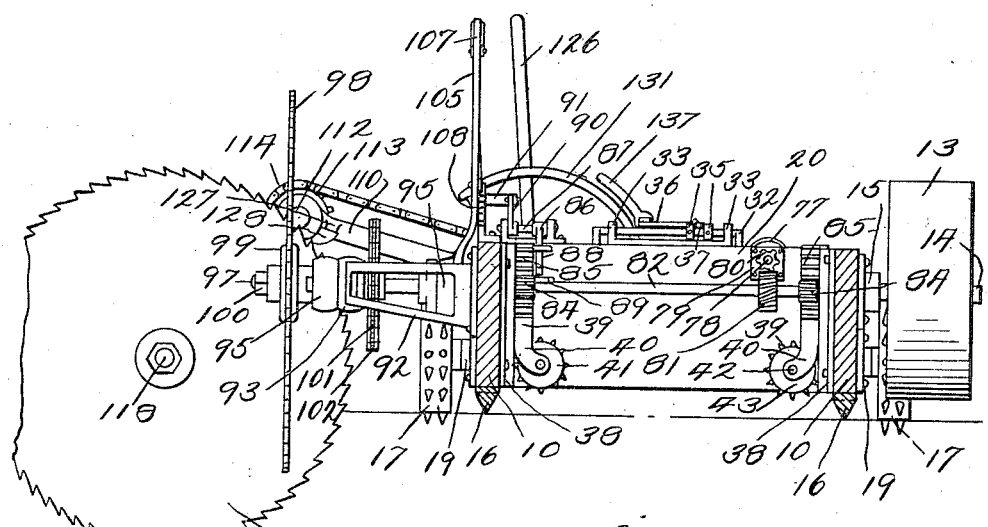
F. A. WARNER.
ICE HARVESTING MACHINE.
APPLICATION FILED SEPT. 5, 1916.
1,228,270.
Patented May 29, 1917.
5 SHEETS—SHEET 3.

F. A. WARNER.
ICE HARVESTING MACHINE.
APPLICATION FILED SEPT. 5, 1916.
1,228,270.
Patented May 29, 1917.
5 SHEETS—SHEET 4.
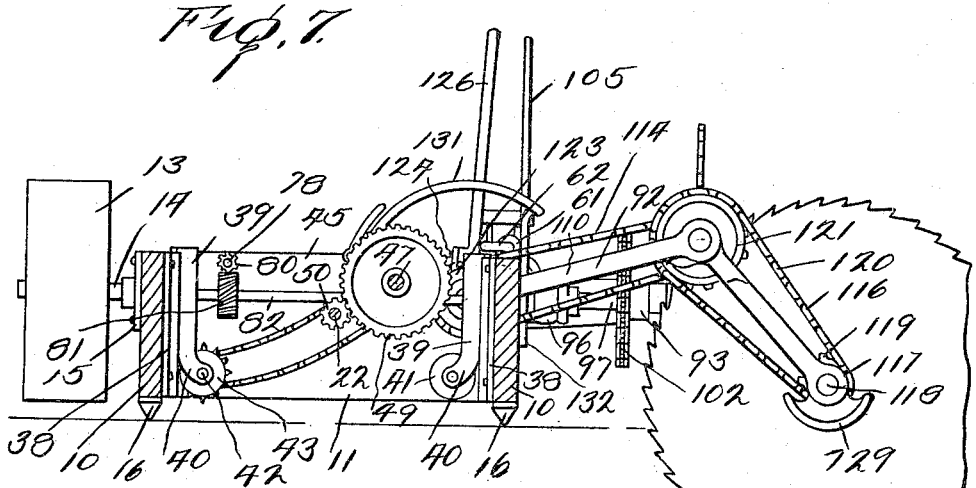
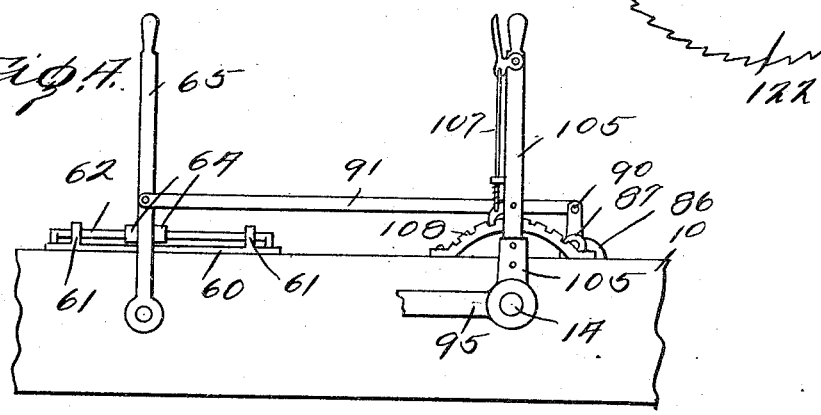
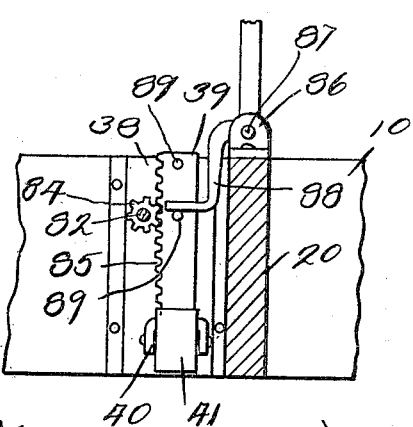
Inventor
F. A. Warner
Witnesses

F. A. WARNER.
ICE HARVESTING MACHINE.
APPLICATION FILED SEPT. 5, 1916.

1,228,270. Patented May 29, 1917.
5 SHEETS—SHEET 5.

Inventor
F. A. Warner

UNITED STATES PATENT OFFICE.

FRED A. WARNER, OF EGREMONT, MASSACHUSETTS.

ICE-HARVESTING MACHINE.

1,228,270.   Specification of Letters Patent.   Patented May 29, 1917.

Application filed September 5, 1916. Serial No. 118,483.

*To all whom it may concern:*

Be it known that I, FRED A. WARNER, a citizen of the United States, residing at Egremont, in the county of Berkshire, State of Massachusetts, have invented certain new and useful Improvements in Ice-Harvesting Machines; and I do hereby declare the following to be a full, clear, and exact description of the invention, such as will enable others skilled in the art to which it appertains to make and use the same.

This invention relates to ice harvesting machines and has special reference to an ice saw.

One object of the invention is to provide an improved form of ice harvesting machine which is adapted to saw the ice both longitudinally and transversely of an ice field.

A second important object of the invention is to provide means whereby the machine may be moved to and fro in a straight line, or, may be bodily transported laterally in either direction.

A third important object of the invention is to provide means whereby to prevent longitudinal movement of the machine while the transverse saw is in operation.

A fourth important object of the invention is to provide improved means for transferring the weight of the machine from devices to guide and move the machine in a longitudinal direction to devices to move the machine in a transverse direction.

A fifth important object of the invention is to provide such transferring mechanism with means for throwing the same out of operation when the required transfer has been made from one set of supports to the other.

A sixth important object of the invention is to provide a construction which includes a feed which will move the lateral saw in the proper direction by the effect of gravity.

With the above and other objects in view, as will be hereinafter apparent the invention consists in general of certain novel details of construction and combinations of parts hereinafter fully described, illustrated in the accompanying drawings, and specifically claimed.

In the accompanying drawings, like characters of reference indicate like parts in the several views, and:—

Fig. 2 is a side elevation of the machine.

Fig. 3 is a section on the line 3—3 of Fig. 1.

Fig. 4 is a detail section on the line 4—4 of Fig. 1.

Fig. 5 is a detail view showing the mechanism for controlling the position of the transverse saw.

Fig. 6 is a section on the line 6—6 of Fig. 1.

Fig. 7 is a section on the line 7—7 of Fig. 1.

Fig. 12 is a perspective view of the transverse saw adjusting mechanism.

Figure 1:
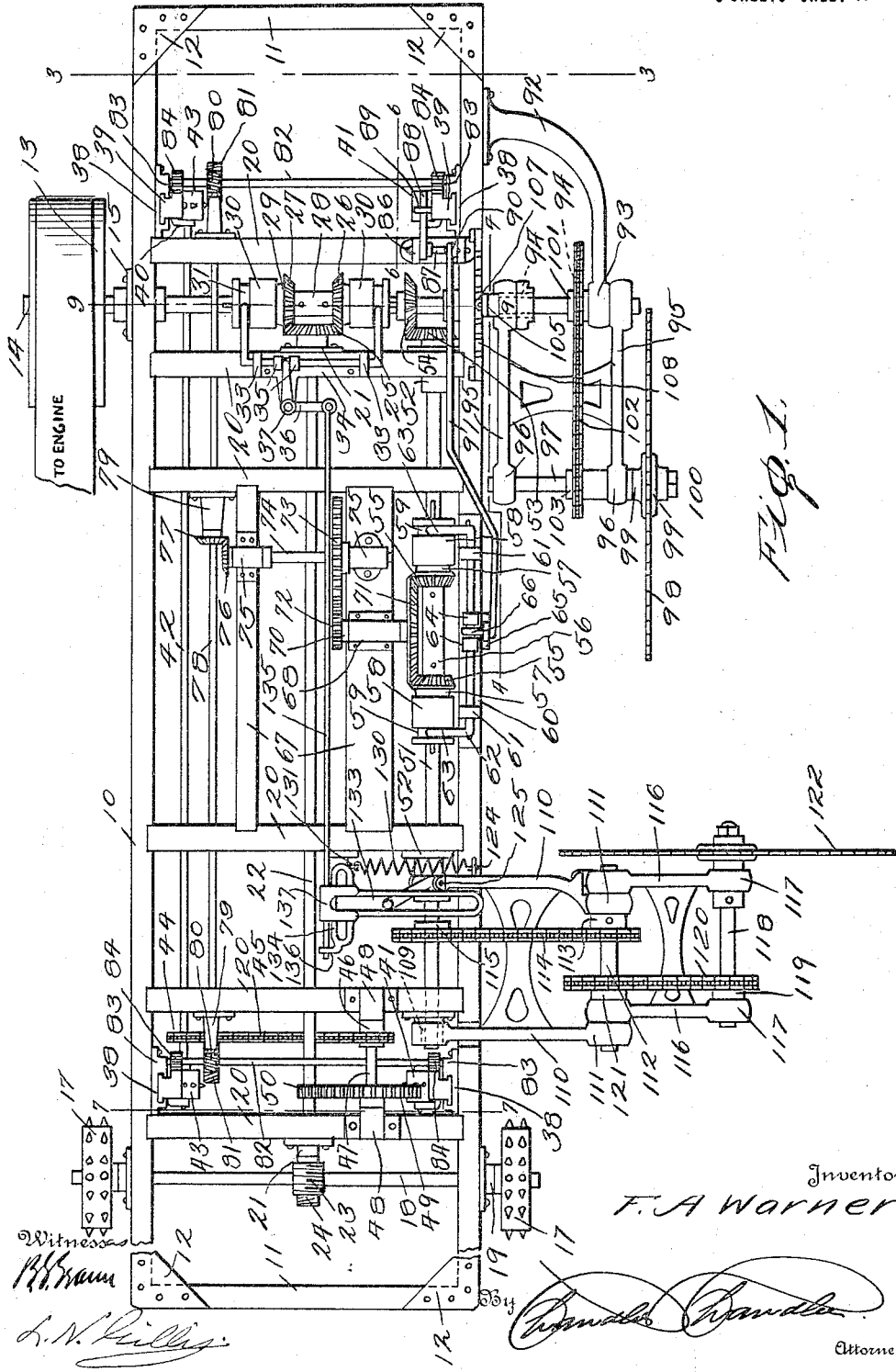
Figure 1 is a plan view of the machine with the driving engine and its platform omitted.
Figure 8:
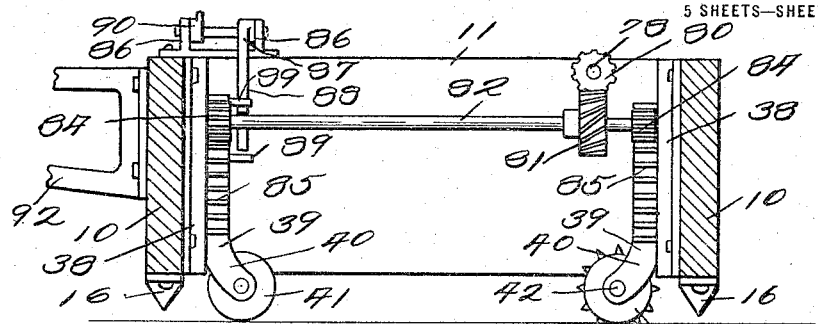
Fig. 8 is a detail section somewhat similar to Fig. 3 with certain of the parts omitted and showing the lateral transfer wheels in use.

In the embodiment of the invention herein illustrated there is shown the main frame consisting of the longitudinal side members 10 and the front and rear members 11, these members being firmly braced together as indicated by the corner braces 12. Mounted at one end of the frame is a suitable engine, (not shown) which is connected by a belt through a pulley 13 keyed upon a shaft 14. The shaft 14 is supported in suitable bearings 15 and extends through the side frame members 10. Moreover, the shaft 14 forms the main driving shaft for all of the other parts of the mechanism as will be hereinafter explained.

Figure 9:
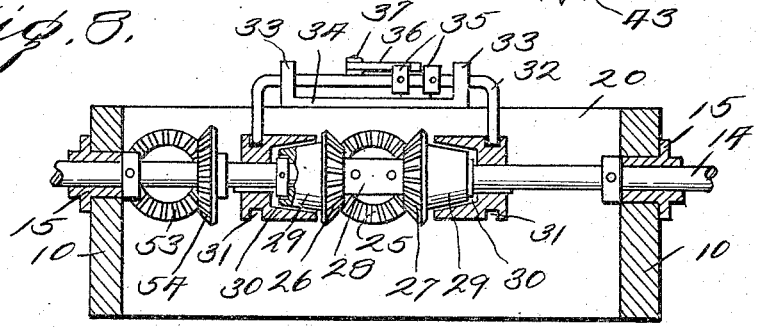
Fig. 9 is a section on the line 9—9 of Fig. 1.
Figures 10, 11:
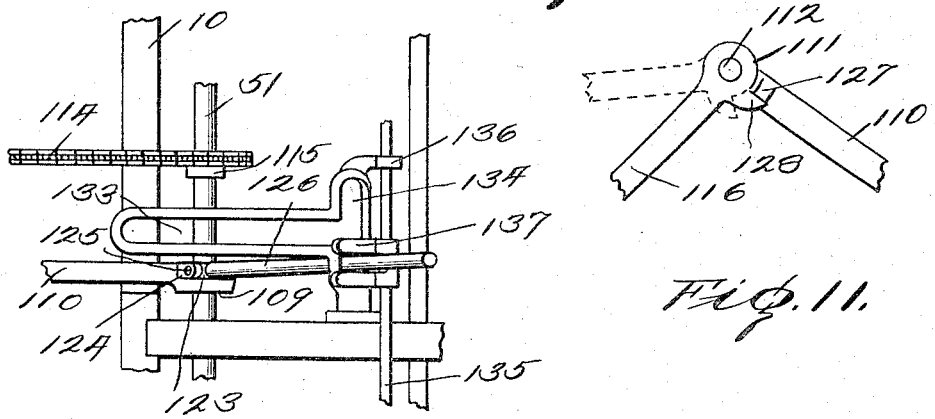
Fig. 10 is a detail plan view of certain lockout mechanism used herewith.
Fig. 11 is a detail view of the transverse saw knuckle.

Let us now consider the means by which the device is supported and driven in a longitudinal direction. At one end of the machine are provided the runners 16 which support this end, the other end being supported on spurred wheels 17 carried on a shaft 18 which is journaled in bearings 19 secured to the side members 10. Extending transversely between the side members 10 are frame members 20 and on these frame members 20 are supported bearings 21 wherein is journaled a shaft 22. On the end of the shaft 22 above the shaft 18 there is provided a spiral gear 23 which meshes with a similar spiral gear 24 keyed to the shaft 18. Thus as the shaft 22 rotates in one direction the shaft 18 will rotate in the corresponding direction. On the shaft 22 at the end opposite the gear 23 is a bevel gear 25 which meshes with bevel gears 26 and 27 mounted revolubly in the shaft 14 and held in proper spaced relation by means of a sleeve 28 pinned to said shaft 14. Attached to each of the gears 26 and 27 is a cone clutch member 29 arranged to coöperate with a hollow clutch member 30 splined to the shaft 14. Each of these clutch members 30 is provided with a peripheral groove 31 which receives the forked end of a U-shaped shipper bar 32, the bight of said bar being slidable through ears 33 formed on a bracket 34 mounted on one of the frame members 20. Carried on the bar 32 is a pair of spaced collars 35 between which fits the forked end of a bell crank lever 36. This bell crank lever 36 is pivoted to the bracket 34 as at 37 and from an inspection of Fig. 1 it will be plain that when the bell crank lever 36 is moved in one direction the shipper member 32 will move both the cone members 30 simultaneously in a corresponding direction. In Fig. 9 the position shown is that in which both of these cone clutch members are disengaged. This is the neutral or central position and with both of these members disengaged it will be obvious that the rotation of the shaft 14 will have no effect on the shaft 22 since the gears 26 and 27 will run idly on the shaft.

However, if the bell crank lever 36 be moved in such direction as to cause the gear 26 to be clutched to the shaft then the shaft 22 will revolve in one direction while if the bell crank lever be moved in the other way so that the gear 27 is clutched to the shaft, the shaft 22 will run in the opposite direction. Thus by proper positioning of the bell crank lever 36 the shaft 22 may be caused to rotate in either direction and the spurred wheel 17 caused to move the machine either forward or backward. The mechanism for moving the machine transversely and for rendering the said mechanism operative will now be described.

At each end of the machine there is provided a pair of oppositely disposed guides 38 which are vertically disposed on opposite frame members 10 and slidable in these guides 38 are cross heads 39 having bifurcated lower ends 40. In the bifurcated ends on one side of the machine are journaled the wheels or rollers 41 while the opposite side of the machine has a shaft 42 journaled in said bifurcated end, the shaft passing through the bifurcations and supporting the spurred wheels 43. On this shaft 42 is provided a sprocket wheel 44 which is connected by a chain 45 with a sprocket wheel 46 mounted on a counter shaft 47 journaled in bearings 48 mounted on a pair of the transverse members 20. There is also keyed on the counter shaft 47 a gear 49 wherewith meshes a pinion 50 keyed to the shaft 22. Thus, as the shaft 22 rotates in either direction, the shaft 47 will be rotated in a corresponding direction and this will in turn cause the shaft 42 to rotate so that the spurred wheels 43 are driven in one direction or the other. It is to be noted that normally these spurred wheels and the wheels 41 are out of contact with the ice on which the machine is supported but they may be brought into contact as desired and caused to lift the machine until the runners 16 and spurred wheels 17 are out of contact with the ice, the wheels 41 and 43 thus supporting the machine for transverse movement. In order to effect this lifting there is provided a shaft 51 journaled in bearings 52 supported on the transverse members 20. Keyed on this shaft 51 is a bevel gear 53 which meshes with a similar bevel gear 54 keyed on the shaft 14. On this shaft 51 is loosely mounted a pair of bevel gears 55. These gears 55 are held in proper spaced relation by means of a sleeve 56 pinned on the shaft 51. Each of the gears 55 is provided with a clutch cone 57 and splined on the shaft 51 are coacting clutch members 58 each provided with a peripheral groove 59. This shaft 51 lies adjacent one of the side members 10 and on this adjacent side member is supported a bracket 60 provided with ears 61. Through these ears 61 slides the bight portion of a U-shaped shipper member 62 having forked ends 63 engaging in the grooves 59. When this shipper member is in the central position shown in Fig. 1 neither of the cones are clutched but when moved the corresponding clutch is operated to connect its gear with the shaft 51. In order to operate the clutches the bight of the member 62 is provided with a pair of spaced collars 64 and pivoted to the frame member 10 is a lever 65 carrying a bent pin 66 which fits between the collars 64 so that movement of the lever 65 in one direction or the other causes movement of the shipper bar 62 in one direction or the other.

Connecting two of the members 20 are longitudinal frame members 67. On one of the members is a bearing 68 wherethrough extends a shaft 70 having keyed to one end a beveled gear 71 which meshes with the gears 55. On the other end of this shaft 70 is a pinion 72 which meshes with a gear 73 keyed upon a shaft 74. This shaft 74 is supported in suitable bearings 75 on the members 67. On the shaft 74 is also keyed a beveled gear 76 which meshes with a beveled gear 77 keyed upon a shaft 78 supported in bearings 79 carried by the members 20. At each end of the shaft 78 is keyed thereon the spiral gear 80 which meshes with a corresponding spiral gear 81 keyed upon a shaft 82. Each of these shafts 82 is journaled in suitable bearings 83 formed on the guides 38 and keyed to each of said shafts 82 is a pair of pinions 84 which mesh with racks 85 formed on the cross heads 39. By means of this arrangement the clutching of either of the gears 55 to the shaft 51 will cause rotation of the shaft 70 and consequently through the gearing will cause rotation of the shaft 78. This shaft in turn will rotate the shaft 82 so that, in accordance with which of these gears 55 has been clutched the pinions 84 will cause upward or downward movement of the cross heads 39 with relation to the frame.

In order to limit this upward and downward movement automatically and to prevent the cross heads being raised to too great a distance or pushed down too far certain mechanism is provided. Mounted on one of the cross members 20 is a bracket provided with a pair of ears 86 wherein is journaled a shaft 87 carrying a rock arm 88. This rock arm 88 is located at its outer end between a pair of pins 89 carried by one of the cross heads 39 so that as this cross head moves up the lower pin 89 will engage with the rock arm 88 while, when the cross head moves down, the upper pin 89 will engage with said rock arm. This will cause movement of the shaft 87. On this shaft 87 is a further rock arm 90 which is connected by a reach rod 91 with the lever 65. The normal or neutral positions of these parts and of the lever 65 are shown in Figs. 4, and 6, the cross heads being at this time raised. If it be desired to lower the heads and consequently bring the rollers 41 and 43 into contact with the ice, the lever 65 is moved to the left in Fig. 1 which causes the rock arm 88 to raise from the position shown. This also causes clutching of the proper members 57 and 58 and operates the shafts 82 as previously described. The cross heads thereupon move downward and as the upper pin 89 engages the rock arm 88 the lever 65 will be gradually restored to its central position so that when the cross heads have moved down to their limit the lever 65 will again be in neutral position and both of the gears 55 unclutched. It will be obvious that the reverse will be true in raising the cross heads.

Let us now consider the operation of the longitudinal saw. Secured to one of the side frame members is a bracket 92 the end of which forms an outboard bearing 93 through which passes the shaft 14. Mounted on the shaft 14 are suitable sleeves 94 forming bushings and keyed to these bushings are arms 95, the bushings forming pivots for the said arms. The free ends of these arms 95 are provided with bushed bearings 96 through which passes the saw arbor 97 having the saw 98 mounted thereon by means of the usual collars 99 and nut 100. On the shaft 14 is a sprocket wheel 101 which is connected by means of a sprocket chain 102 with a sprocket wheel 103 mounted on the shaft 97. Thus when the shaft 14 rotates the shaft 97 and consequently the saw 98 will also rotate. In order to raise and lower the saw 98 one of the arms 95 is provided with an upward extension 104 to which is fixed a lever 105 carrying a latch 107 which operates over a quadrant 108 securely mounted on one of the frame members 10. By this means the height of the saw may be adjusted so that it may be raised entirely clear of the ice when desired or dropped as low as is found necessary to completely cut through the ice or cut as deep a groove therein as may be wished.

Let us now consider the operation of the transverse saw. The shaft 51 has mounted thereon suitable bushings 109 and pivotally mounted on these bushings are arms 110. These arms 110 have bearings 111 at their outer ends and journaled in these bearings is a shaft 112 whereon is a sprocket 113. This sprocket 113 is connected by means of a chain 114 with a sprocket 115 keyed upon the shaft 51. Journaled on the shaft 112 is a second pair of arms 116 which have bearings 117 at their free ends. Supported in the bearings 117 is a shaft 118 whereon is keyed a sprocket 119 which is connected by means of a sprocket chain 120 with a sprocket 121 keyed upon the shaft 112. This shaft 118 forms the saw arbor and a saw 122 is mounted thereon by means of the usual construction as desired in connection with the saw 98. It will be observed that this construction places the saw 98 parallel with the longitudinal axis of the machine while the saw 122 is at right angles to such longitudinal axis. It will also be observed that the arms 110 and 116 form a species of knuckles. In order to regulate the position of the saw 122 with regard to the ice there is provided on one of the arms 110 a bracket 123 provided with spaced ears 124 which form bearings for a shaft or pin 125 which extends in a direction transverse the shaft 51. Pivoted on this pin 125 is a lever 126, and by means of the lever 126 the arms 110 may be raised or lowered and the outer end of one of these arms is provided with a stop lug 127 which is engageable by a similar stop lug 128 carried on the corresponding arm 116. Thus these two stop lugs prevent the arm 116 from swinging too close to the arm 110 so that after the arm 110 has been lifted by the lever 126 to a certain extent the stop lugs 128 and 127 engage and further movement of the lever 126 causes the outer end of the arm 116 to be elevated. In order to prevent the saw 122 from sinking too deeply in the ice there is provided on the shaft 118 a shoe 129 which, when the saw is at its deepest point, rests on the ice. Furthermore after the saw has cut as deeply into the ice as to bring this shoe 129 into contact with such ice the lever 126 may be released and the weight of the parts 110 and 116 will cause the shaft 118 to move outward away from the frame of the machine so that the saw will be fed in the proper direction. In order to assist in balancing the weight of the arms 110 and 116 there is connected to one of the arms 110 a spring 130 the other end of said spring being connected to a bracket 131 secured to one of the members 20. This bracket 131 extends arcuately about the shaft 51 and concentric thereto, the outer end of the bracket being supported on one of the members 10 by means of a strut 132. Moreover, the bracket 131 is provided with a T-shaped slot having a stem 133 and branches 134 forming a head. The lever 126 is guided by this slot so that no lateral movement of the lever about the pin 125 is possible so long as such lever is in the slot 133. When, however, the lever is pulled into such position as to completely lift the saw 122 from the ice it will be opposite the head of the T and may be moved into one of the extensions 134 and when so moved will hold the arms 110 and saw 122 in raised position.

In order to prevent any forward feeding of the machine by the wheels 17 when the saw 122 is engaged in the ice provision is made that the wheels 26 and 27 shall be unclutched under these circumstances. To this end there is connected to the bell crank lever 36 a reach rod 135 the forward end of which is slidable through a bearing 136 on the bracket 131. Fixed on this reach rod 135 is a U-shaped member 137 adapted to receive the lever 126. When the lever is in the slot 135 the U-shaped member 137 will have its interior portion registering with the slot and at that time the parts are so arranged that both the gears 26 and 27 will be unclutched. When, however, the lever 126 is moved to raise the saw 122 from the ice this lever will engage in the U-shaped member 137 and by moving the lever to one of the pockets 134 one or the other of the gears 26 or 27 may be clutched.

In the beginning of the operation of cutting an ice field both the saws are raised and the device positioned properly on the ice, the position preferably being that in which the greatest length of run can be obtained. Then the saw 98 is lowered and the engine started to drive the shaft 14 and consequently the shaft 98. At this time the lever 126 is manipulated to cause the machine to move over the ice by the clutching of one or the other of the gears 26 or 27. When the end of the cut has been reached the lever 126 is moved to neutral position and the saw 98 raised. Then the lever 65 is operated to bring the wheels 41 and 43 into play and to raise the wheels 17 and runners 16 off the ice. The lever 126 is again moved so that the machine is moved away from the cut just formed by the saw 98. The proper position having been obtained the lever 126 is moved to neutral position and the lever 65 again manipulated to lower the machine until the runners 16 and wheels 17 engage the ice. Then the lever 126 is moved to start the machine back while at the same time the saw 98 is brought into play. After the machine has traveled the desired distance the lever 126 is thrown into neutral position whereupon the machine will stop its longitudinal movement and then the lever 126 is thrown forward so that the saw 122 engages the ice and cuts off a block. The block having been severed the lever 126 is thrown backward and again moved to drive the machine along a distance suitable to cut off a second block, this operation being repeated for each block and the operation of shifting the machine laterally being repeated at the end of each roll.

There has thus been provided a highly efficient device of the kind described and for the purpose specified.

It is obvious that many minor changes may be made in the form and construction of the invention without departing from the material principles thereof. It is not therefore desired to confine the invention to the exact form herein shown and described but it is wished to include all such as properly come within the scope claimed.

Having thus described the invention, what is claimed as new, is:—

1. In an ice harvesting machine, a frame, traction devices mounted on the frame for vertical movement relative to said frame, gearing arranged to move said traction devices upward and downward and including a bevel driving gear and a pair of bevel driven gears selectively meshing with the driving gear but normally out of mesh therewith, means to bring either of said driven gears into mesh with the driving gear to effect movement of the traction devices, and other means to move the last mentioned means to throw the meshing driven gear out of mesh automatically upon the traction devices reaching the desired limit of movement.

2. In an ice harvesting machine, a frame, a drive shaft journaled on the frame, a saw supported by the frame and movable transversely of the frame into and out of cutting position, a lever controlling the position of the saw and movable in two directions at right angles to each other, a guide for said lever arranged to prevent movement of the lever in one direction when the saw is in cutting position, a traction mechanism carried by the frame and including means releasably connected to the shaft, and means controlled by the movement of the lever in the second direction to connect and disconnect the last-mentioned means to the shaft.

3. In an ice harvesting machine, a frame, a drive shaft journaled on the frame, a saw supported by the frame and movable transversely of the frame into and out of cutting position, a lever controlling the position of the saw and movable in two directions at right angles to each other, a guide for said lever arranged to prevent movement of the lever in one direction when the saw is in cutting position, a traction mechanism carried by the frame and including means releasably connected to the shaft, and means controlled by the movement of the lever in the second direction to connect and disconnect the last-mentioned means to the shaft, the lever controlled means being engaged by the lever when the saw is moved out of cutting position and being disengaged from the lever when the saw is moved into cutting position.

In testimony whereof, I affix my signature, in the presence of two witnesses.

FRED A. WARNER.

Witnesses:
ARTHUR H. TUTTLE,
HENRY C. CLARK.

Copies of this patent may be obtained for five cents each, by addressing the "Commissioner of Patents, Washington, D. C."